United States Patent
Oka et al.

(10) Patent No.: US 8,981,614 B2
(45) Date of Patent: Mar. 17, 2015

(54) STATOR FOR ELECTRICAL ROTATING MACHINE

(75) Inventors: Keiichiro Oka, Tokyo (JP); Hiroyuki Akita, Tokyo (JP); Toshio Arai, Tokyo (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 502 days.

(21) Appl. No.: 13/375,873

(22) PCT Filed: Apr. 5, 2010

(86) PCT No.: PCT/JP2010/002483
§ 371 (c)(1),
(2), (4) Date: Dec. 2, 2011

(87) PCT Pub. No.: WO2011/013273
PCT Pub. Date: Feb. 3, 2011

(65) Prior Publication Data
US 2012/0080976 A1    Apr. 5, 2012

(30) Foreign Application Priority Data

Jul. 28, 2009    (JP) .................................. 2009-174852

(51) Int. Cl.
*H02K 3/34*    (2006.01)
*H02K 3/52*    (2006.01)
(Continued)

(52) U.S. Cl.
CPC ................ *H02K 3/522* (2013.01); *H02K 3/325* (2013.01); *H02K 1/148* (2013.01); *H02K 2203/12* (2013.01)
USPC ..................... 310/215; 310/214; 310/216.009

(58) Field of Classification Search
CPC .......... H02K 1/148; H02K 3/34; H02K 3/345; H02K 3/48; H02K 3/487; H02K 3/493; H02K 2203/12
USPC ............ 310/194, 214, 215, 216.008, 216.009
See application file for complete search history.

(56) References Cited

FOREIGN PATENT DOCUMENTS

| JP | 10126997 A | * | 5/1998 | ............... H02K 3/34 |
| JP | 2000060046 A | * | 2/2000 | ............... H02K 3/34 |
| JP | 2002084698 A | * | 3/2002 | ............... H02K 3/34 |

(Continued)

OTHER PUBLICATIONS

Ozeki, JP2003061286 Machine Translation, Feb. 2003.*
Kojima et al., JP2000060046 Machine Translation, Feb. 2000.*
Satake et al., JP2009033810 Machine Translation, Feb. 2009.*

(Continued)

*Primary Examiner* — Burton Mullins
*Assistant Examiner* — Eric Johnson
(74) *Attorney, Agent, or Firm* — Buchanan Ingersoll & Rooney PC

(57) ABSTRACT

Included are a pair of insulators arranged on axial end surfaces of a split core, and an insulating film attached to lateral side surfaces of the tooth part, for insulating the split core from a coil wound around the tooth part. Each insulator includes projections projecting further than a tooth front end part in the circumferential direction, slits which are formed in the respective projections to a corresponding axial end surface side of the tooth front end part and into which the insulating film is inserted, and ribs formed, on an end surface side in the circumferential direction, in the respective projections. The insulating film inserted into the slits is folded back to a back yoke part side with the ribs interposed therein, and fixed by being interposed between the ribs at tip portions of projections of adjacent insulators. Accordingly, the insulating film can be assuredly fixed and prevented from escaping from a slot.

10 Claims, 20 Drawing Sheets

(51) Int. Cl.
*H02K 3/32* (2006.01)
*H02K 1/14* (2006.01)

(56) References Cited

FOREIGN PATENT DOCUMENTS

| JP | 2003-61286 | A |   | 2/2003 |
|----|------------|---|---|--------|
| JP | 2005-143172 | A |   | 6/2005 |
| JP | 4109016 | B2 |   | 6/2008 |
| JP | 2008167518 | A | * | 7/2008 |
| JP | 2009-33810 | A |   | 2/2009 |

OTHER PUBLICATIONS

Yamane et al., JP2008167518 Machine Translation, Jul. 2008.*
Matsuoka et al., JP2002084698 Machine Translation, Mar. 2002.*
Chinese Office Action (First Notice of Reasons for Rejection) dated May 28, 2013, issued by the Chinese Patent Office in corresponding Chinese Patent Application No. 201080028338.8, and English language translation of Office Action. (10 pages).
International Search Report (PCT/ISA/210) issued on Jul. 6, 2010, by Japanese Patent Office as the International Searching Authority for International Application No. PCT/JP2010/002483.
Korean Office Action dated Nov. 16, 2012, with English-language translation.

* cited by examiner

STATOR FOR ELECTRICAL ROTATING MACHINE

TECHNICAL FIELD

The present invention relates to a structure of a stator for an electrical rotating machine.

BACKGROUND ART

In a conventional stator for an electrical rotating machine, with respect to a slot insulation, an insulating film is arranged so as to extend inside and along the shape of the slot, and a coil is wound over the insulating film, thereby electrically insulating a tooth from the coil; and with respect to an interphase insulation, an insulating film is inserted and interposed between coils wound around adjacent teeth, respectively, thereby electrically insulating the coils from each other (for example, see Patent Literature 1).

CITATION LIST

Patent Literature

Patent Literature 1: Japanese Patent No. 4109016 (paragraph numbers [0007], [0008], FIG. 1, and the like)

DISCLOSURE OF THE INVENTION

Problems to be Solved by the Invention

In recent years, competition of developing higher-efficiency motors has become more intense. As one of the means that contribute to realization of higher efficiency, in order to improve the space factor of a coil, technology is required that allows an insulating material composed of a resin molded article to be replaced by an insulating film.

The above conventional electric-motor stator includes a slot insulation which is intended to provide insulation between a tooth and a coil by arranging an insulating film so as to extend inside and along a slot, and an interphase insulation which is intended to provide insulation between adjacent coils by being inserted between the coils that have been wound. Thus, the conventional electric-motor stator intends to provide insulation for coils and iron cores. However, in a case where the slot insulation and the interphase insulation are realized by means of a film insulating material, handling and positioning of the film insulating material are difficult, and for example, there is a problem in that the insulating film escapes from a slot opening while the motor is being driven. In particular, in a case where a coil is wound up to a vicinity of the slot opening in order to improve the space factor, such a problem becomes evident.

The present invention has been made in order to solve the above problems. An object of the present invention is to provide a stator that can assuredly fix an insulating film and that can prevent the insulating film from escaping from the slot.

Solution to the Problems

A stator for an electrical rotating machine according to the present invention is a stator for an electrical rotating machine including a plurality of split cores that are annularly arranged, each split core composed of a back yoke part extending in the circumferential direction, a tooth part that is centrally-directed and projecting from a middle portion of the back yoke part, and a tooth front end part located at a front end of the tooth part. The stator includes a pair of insulators arranged on axial end surfaces, respectively, of the split core, and an insulating film attached to lateral side surfaces of the tooth part, for insulating the split core from a coil wound around the tooth part. Each insulator includes projections projecting further than the tooth front end part in the circumferential direction, slits which are provided in the respective projections to a corresponding axial end surface side of the tooth front end part and into which the insulating film is inserted, and ribs formed in the respective projections, on end surface sides in the circumferential direction of the respective projections. The insulating film inserted into the slits is folded back to a back yoke part side with the ribs interposed therein and fixed by being interposed between the ribs and adjacent ribs.

Effect of the Invention

According to the stator for the electrical rotating machine according to the present invention, the insulating film inserted into the slits is folded back to the back yoke part side with the ribs interposed therein, and is fixed by being interposed between the projections and projections of adjacent insulators. Accordingly, it is possible to position and fix the insulating film in an assured manner. Moreover, by the insulating film being fixed, it is possible to prevent the insulating film from escaping from a slot opening at the teeth front end portions, to an inner periphery side.

BEST MODE FOR CARRYING OUT THE INVENTION

Embodiment 1

Figure 1:
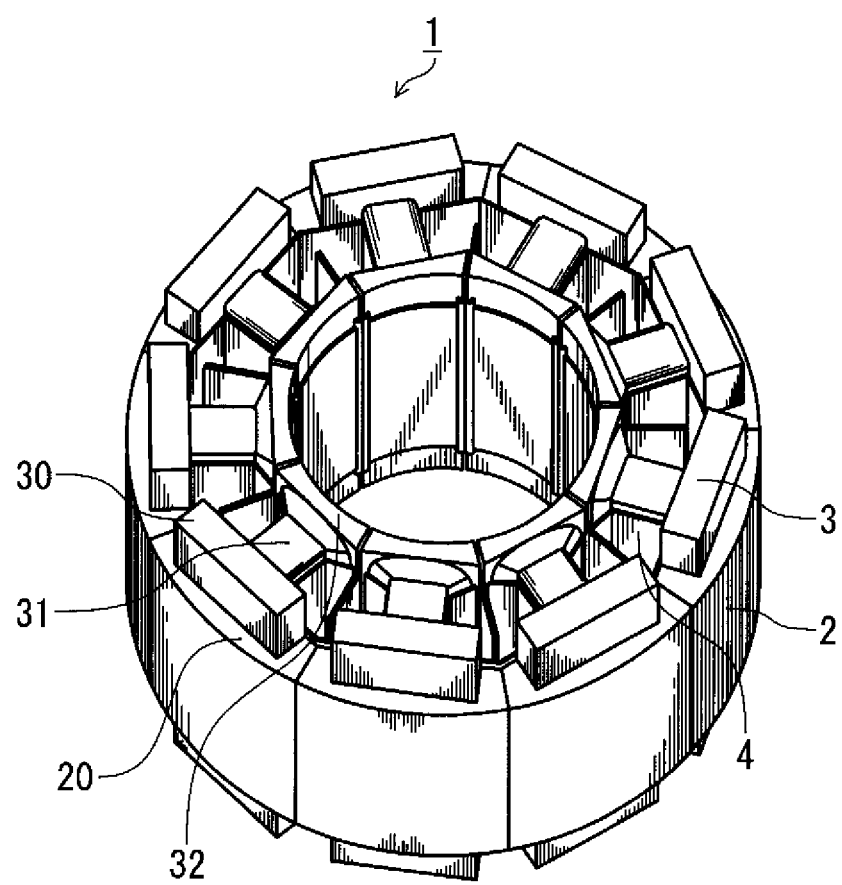
FIG. 1 is a perspective view showing a structure of a stator for an electrical rotating machine according to embodiment 1 of the present invention.
Figure 2:
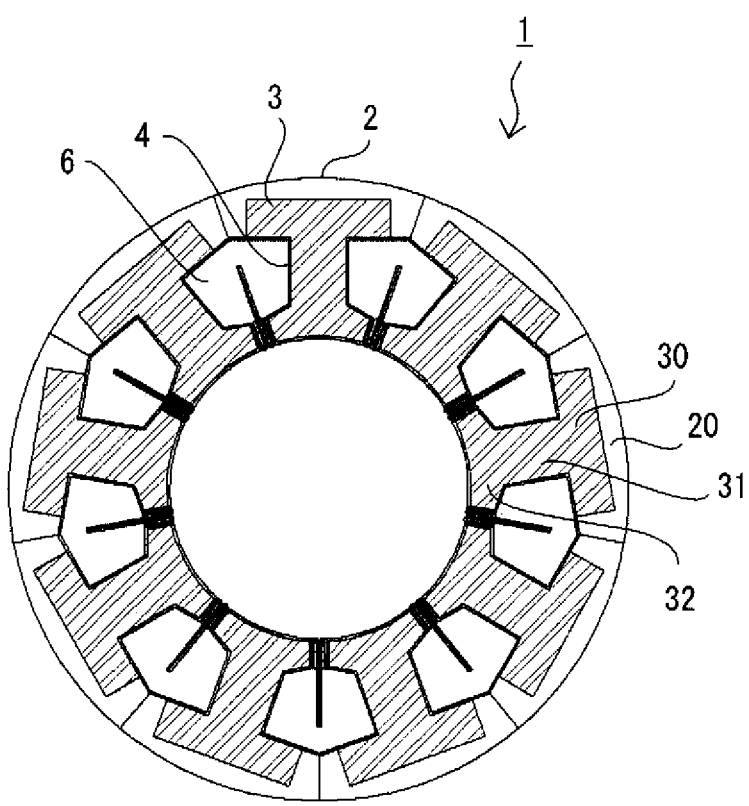
FIG. 2 is a cross-sectional view showing a structure of the stator for the electrical rotating machine according to embodiment 1 of the present invention.
Figure 3:
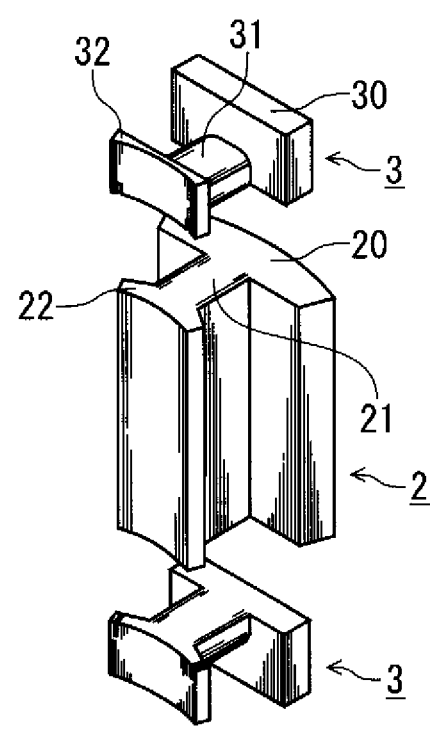
FIG. 3 is an exploded perspective view for illustrating structures of a split core and insulators according to embodiment 1 of the present invention.
Figure 4:
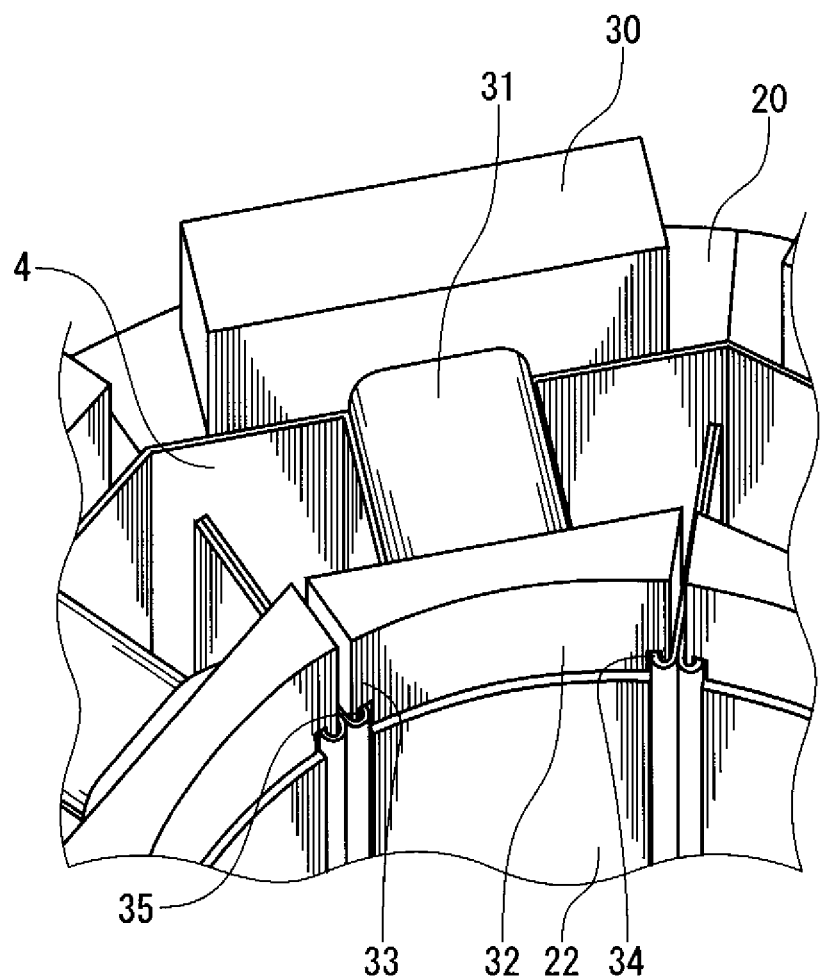
FIG. 4 is a partially enlarged view of FIG. 1 according to embodiment 1 of the present invention.
Figure 5:
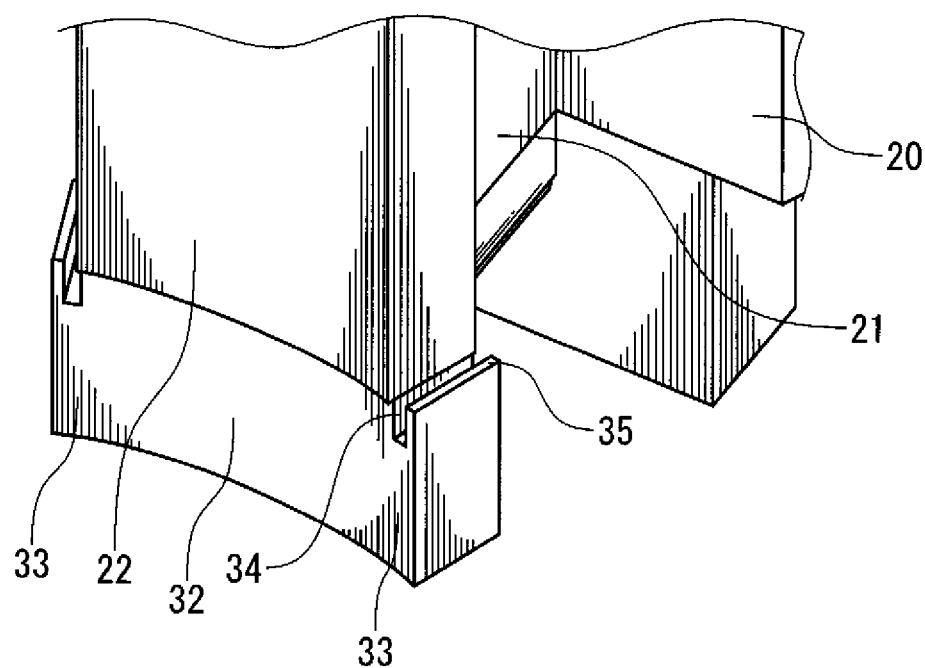
FIG. 5 is an enlarged perspective view of an insulator attached to the split core according to embodiment 1 of the present invention.
Figure 6:
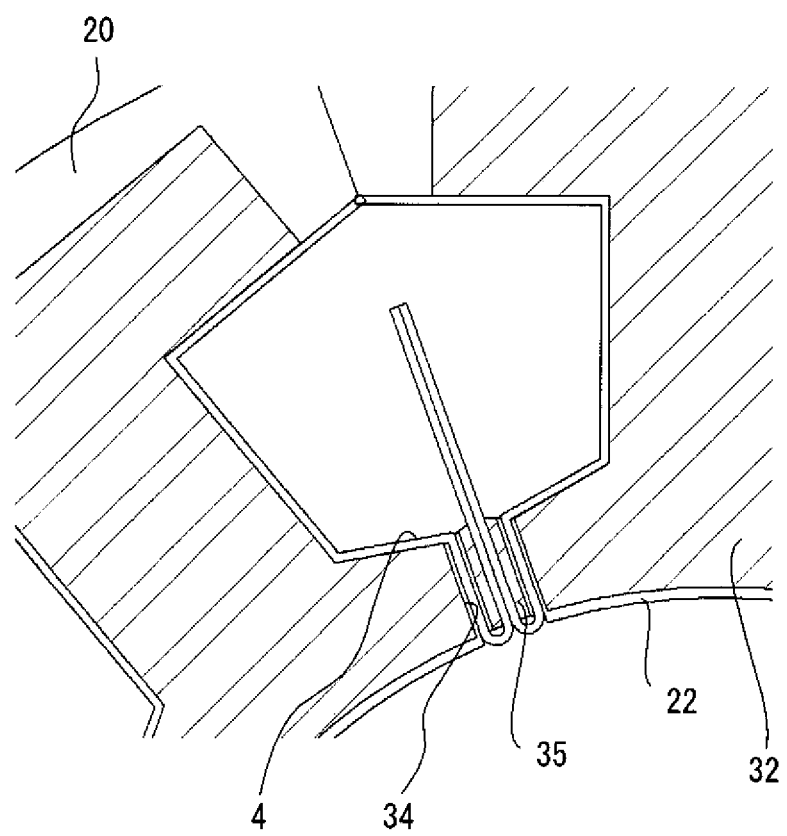
FIG. 6 is a partially enlarged view of FIG. 2 according to embodiment 1 of the present invention.

FIG. 1 is a perspective view showing a structure of a stator for an electrical rotating machine according to embodiment 1 of the present invention, FIG. 2 is a cross-sectional view of FIG. 1, FIG. 3 is an exploded perspective view for illustrating structures of a split core and insulators, FIG. 4 is a partially enlarged view of FIG. 1, FIG. 5 is an enlarged perspective view of an insulator attached to the split core, and FIG. 6 is a partially enlarged view of FIG. 2.

As shown in FIGS. 1 to 3, a stator 1 is the stator 1 for an electrical rotating machine, including a plurality of split cores 2 that are annularly arranged. A rotor not shown is arranged on an inner periphery side of the stator 1 with a predetermined air gap therebetween.

Each split core 2 is composed of a back yoke part 20 extending in the circumferential direction, a tooth part 21 that is centrally-directed and projecting from a middle portion of the back yoke part 20, and a tooth front end part 22 located at a front end of the tooth part 21. The tooth front end part 22 has a shape projecting further than the tooth part 21 to both sides in the circumferential direction.

To axial end surfaces of each split core 2, a pair of insulators 3 are attached, respectively, in such a manner as to cover the back yoke part 20, the tooth part 21, and the tooth front end part 22 of the split core 2. To each side in the circumferential direction of the split core 2, an insulating film 4 having a film shape that covers an inner periphery surface of the back yoke part 20 and a lateral side surface of the tooth part 21 is attached. A coil 5 not shown is wound around the insulating film 4 and the insulators 3, thereby being wound around the tooth part 21. The split core 2 is electrically insulated from the coil 5 by the insulators 3 and the insulating film 4.

The split cores 2 each having the coil 5 wound therearound as a result of the coil 5 being wound around the insulating film 4 and the insulators 3 are annularly arranged such that end portions in the circumferential direction of adjacent back yoke parts 20 contact each other, thereby forming the stator 1 having a slot 6 between adjacent tooth parts 21.

Each of the pair of the insulators 3 is made of, for example, a resin molded article, and includes a yoke covering part 30 covering a part of the back yoke part 20, a tooth covering part 31 covering the tooth part 21, and a front end covering part 32 covering the tooth front end part 22, of the split core 2. As shown in FIG. 4 and FIG. 5, the front end covering part 32 includes projections 33 each projecting further than the tooth front end part 22 in the circumferential direction. Slits 34 are formed in respective projections 33, to a corresponding axial end surface side of the tooth front end part 22, in such a manner as to extend in directions along respective end surfaces in the circumferential direction of the tooth front end part 22. By the slits 34 being formed, ribs 35 are formed at tip portions of the projections 33, respectively, the tip portions being on end surface sides in the circumferential direction of the projections, respectively.

Moreover, an inner periphery surface of the insulator 3, that is, an inner periphery surface of the front end covering part 32 of the insulator 3 is recessed to the radially outer side relative to an inner periphery surface of the tooth front end part 22, by at least the thickness of the insulating film 4.

The insulating film 4 is an insulating material having a film shape made of resin such as, for example, polyethylene terephthalate (PET), and as shown in FIG. 4 and FIG. 6, covers the inner periphery surface of the back yoke part 20, the lateral side surface of the tooth part 21, and an outer periphery surface of the tooth front end part 22, by extending along them. The axial length of the insulating film 4 is set to be greater than the axial length of the split core 2. A portion, on the tooth front end part 22 side, of the insulating film 4 is inserted into the slits 34 in the insulators 3 from a radially outer side, and is folded back to a back yoke part 20 side, with the ribs 35 interposed therein. The folded-back insulating film 4 is fixed by being interposed between the ribs 35 and adjacent ribs 35 that are at tip portions of projections 33 of insulators 3 attached to an adjacent split core 2. At this time, if the inner periphery surface of the front end covering part 32 of each insulator 3 is configured to be recessed by at least the thickness of the insulating film 4 to the radially outer side relative to the inner periphery surface of the tooth front end part 22, it is possible to prevent the folded-back portion of the insulating film 4 from protruding toward the center, further than the inner periphery surface of the tooth front end part 22.

Figure 7:
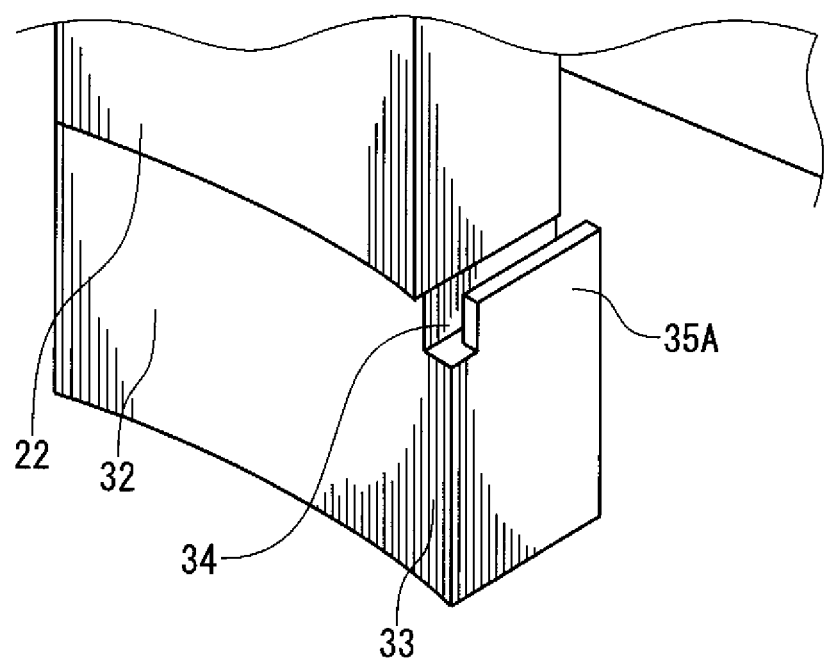
FIG. 7 is a perspective view illustrating a rib of another example according to embodiment 1 of the present invention.
Figure 8:
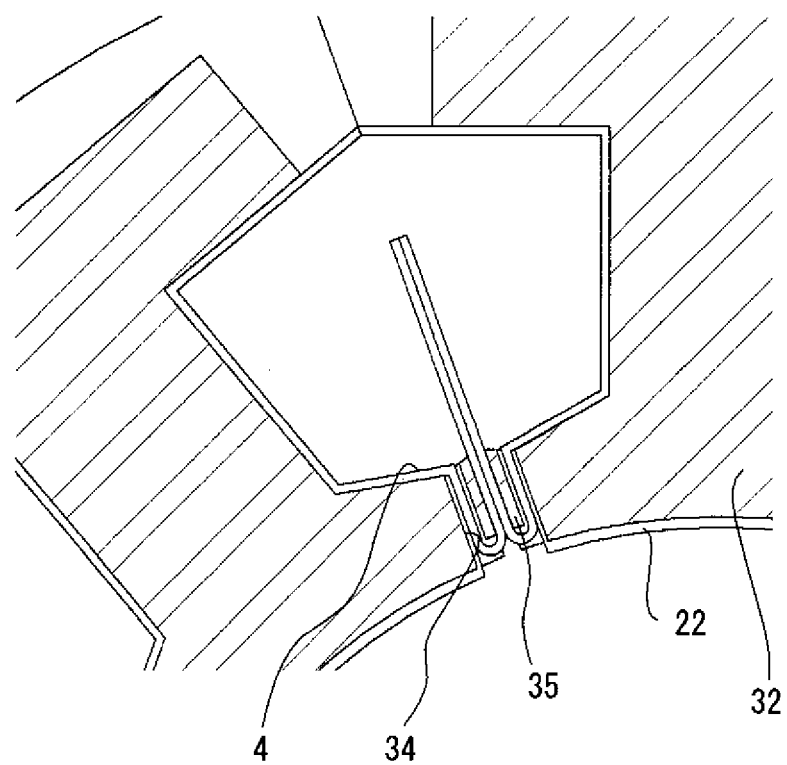
FIG. 8 is a cross-sectional view illustrating the rib according to the other example according to embodiment 1 of the present invention.

In the above example, in the insulator 3, an inner periphery surface of each rib 35 lies in the same plane as an inner periphery surface of a corresponding projection 33 (see FIGS. 5 and 6). However, the shape as shown in FIG. 7 and FIG. 8, for example, may be employed. That is, an inner periphery surface of a rib 35A may be formed in such a manner as to be recessed by at least the thickness of the insulating film 4 to the radially outer side relative to the inner periphery surface of the front end covering part 32 of the insulator 3. It should be noted that FIG. 7 and FIG. 8 show the rib 35A in another example, and correspond to FIG. 5 and FIG. 6, respectively. If the insulating film 4 is folded back along the ribs 35A, it is possible to prevent the folded-back portion of the insulating film 4 from protruding toward the center, further than the inner periphery surfaces of the front end covering part 32 and the tooth front end part 22. Further, in the case of the configuration of the inner periphery surface of the front end covering part 32 being recessed to the radially outer side relative to the inner periphery surface of the tooth front end part 22 as described above, it is possible to assuredly prevent the folded-back portion of the insulating film 4 from protruding toward the center, further than the inner periphery surface of the tooth front end part 22.

Next, an example of assembly steps of the stator 1 will be described with reference to FIG. 9 to FIG. 14. It should be noted that among FIG. 9 to FIG. 14, FIG. 9 employs the rib 35, and FIG. 10 to FIG. 14 employ the rib 35A. However, with either type of the ribs, the stator 1 can be assembled in a similar manner.

Figure 9:
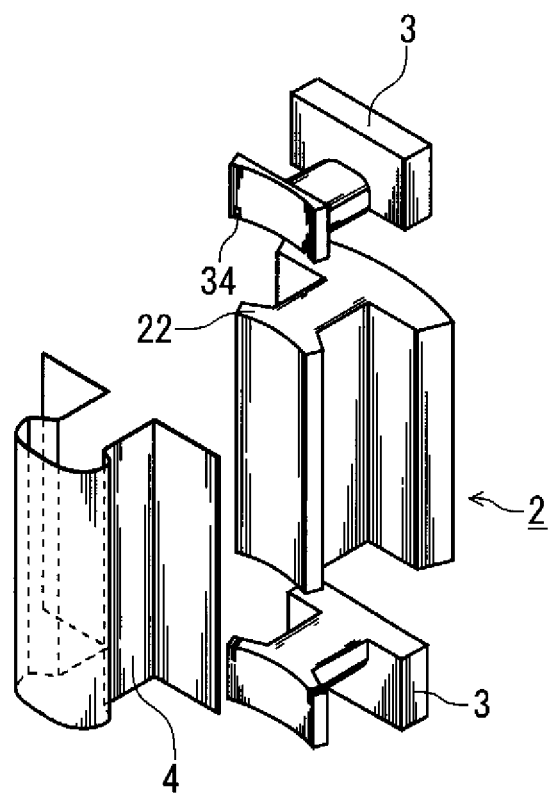
FIG. 9 illustrates an example of an assembly step of the stator for the electrical rotating machine according to embodiment 1 of the present invention.

First, as shown in FIG. 9, the split core 2, a pair of insulators 3, and the insulating film 4 are prepared. The insulating film 4 has already been machined to have a bent shape that suits the shape of the split core 2, and has a shape in which portions of the insulating film 4 to be arranged on both lateral sides of the split core 2, respectively, are continuous with each other on the inner periphery side of the tooth front end part 22. Such an insulating film 4 can be formed by bending one sheet of film-shaped insulating material having a rectangular parallelepiped shape.

Figure 10:
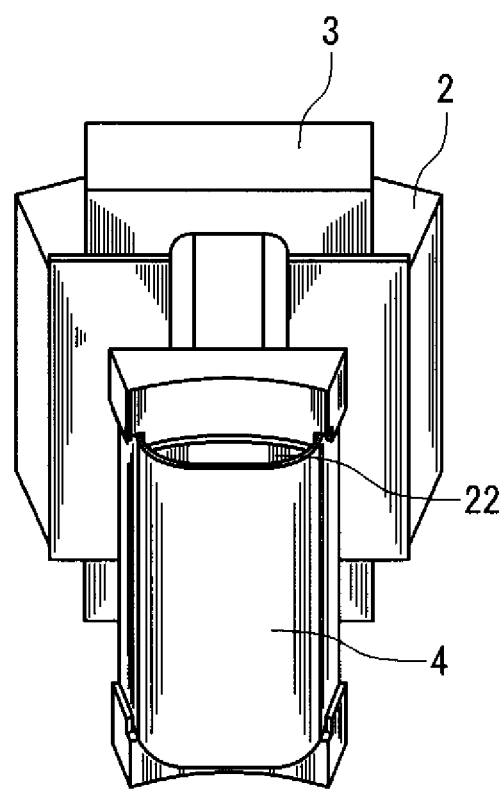
FIG. 10 is a perspective view illustrating an example of an assembly step of the stator for the electrical rotating machine according to embodiment 1 of the present invention.

Next, each member is attached. First, the insulating film 4 is attached to the split core 2. Then, the insulators 3 are attached to the split core 2, from both axial directions, respectively, such that the insulating film 4 is inserted in the slits 34. The insulators 3 are fixed to the split core 2 by, for example, pins, adhesives, and the like. FIG. 10 is a perspective view showing a state where the insulating film 4 and the insulators 3 are attached to the split core 2. Thereafter, the coil 5 not shown is wound around the insulating film 4 and the insulators 3, thereby being wound around the tooth part 21.

Figure 11:
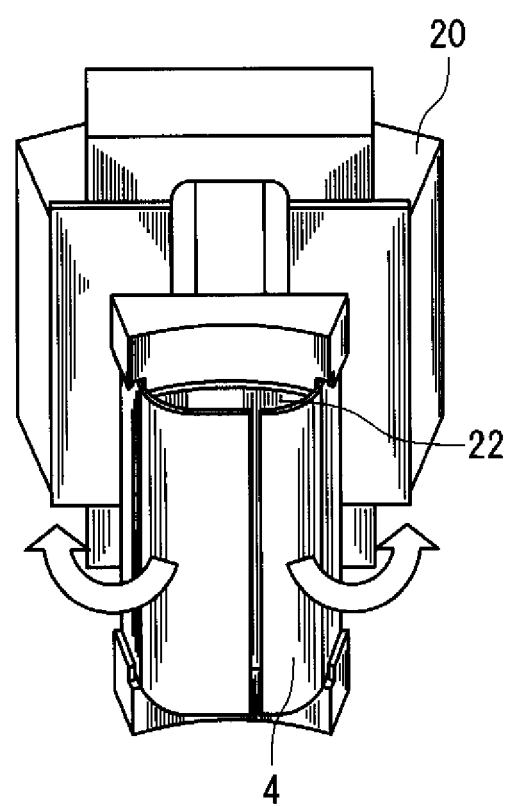
FIG. 11 is a perspective view illustrating an example of an assembly step of the stator for the electrical rotating machine according to embodiment 1 of the present invention.
Figure 12:
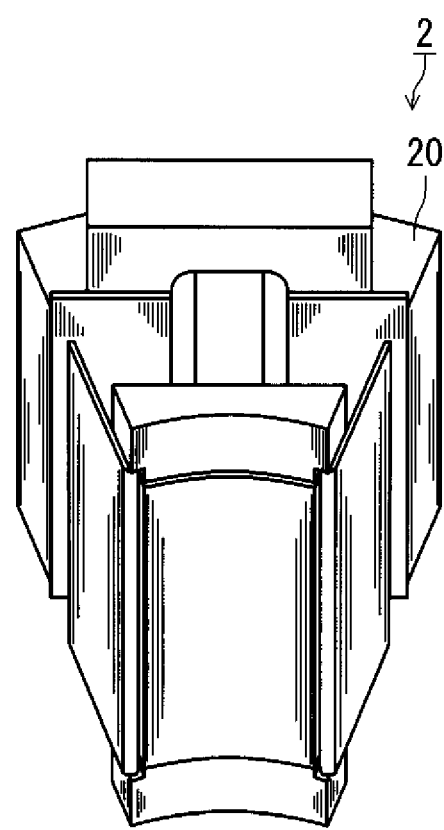
FIG. 12 is a perspective view illustrating an example of an assembly step of the stator for the electrical rotating machine according to embodiment 1 of the present invention.
Figure 13:
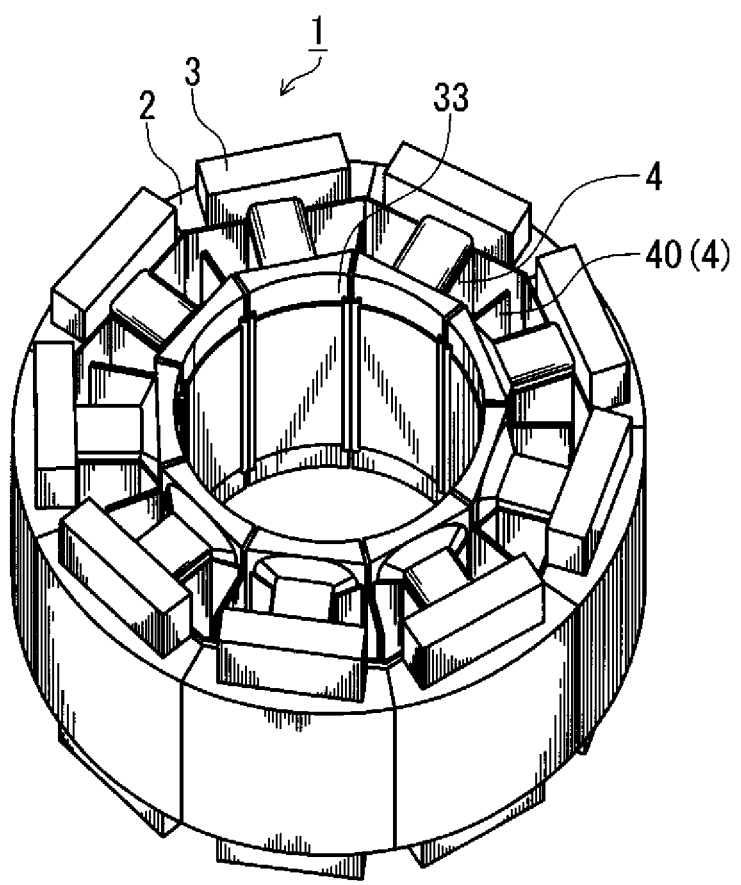
FIG. 13 is a perspective view illustrating an example of an assembly step of the stator for the electrical rotating machine according to embodiment 1 of the present invention.
Figure 14:
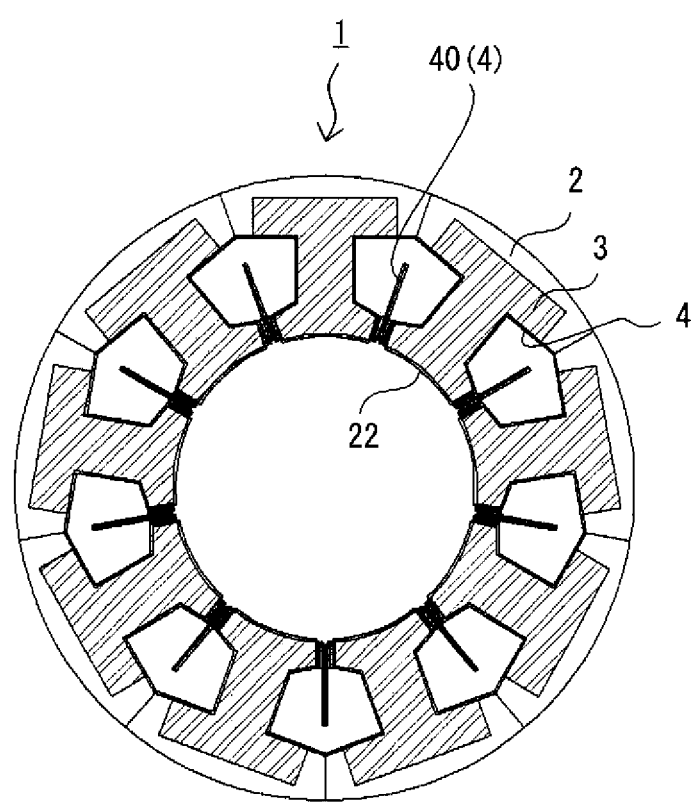
FIG. 14 is a cross-sectional view illustrating an example of an assembly step of the stator for the electrical rotating machine according to embodiment 1 of the present invention.

Next, as shown in FIG. 11, the portion, of the insulating film 4, that covers the inner periphery surface of the tooth front end part 22 is cut in the axial direction, and each of the cut end portions of the insulating film 4 is turned around as shown by a corresponding arrow in FIG. 11 in such a manner as to interpose the ribs 35A therein, and is folded back to the back yoke part 20 side. The back yoke part 20 of each split core 2 formed in this manner as shown in FIG. 12 is caused to contact a back yoke part 20 of an adjacently arranged split core 2, whereby the back yoke parts 20 are annularly arranged. The split cores 2 are coupled by means of welding, shrinkage fit, or the like, thereby forming the stator 1 as shown in FIG. 13 and FIG. 14. At this time, each folded-back insulating film 4 is assuredly fixed by being interposed between the ribs 35 that are at tip portions of projections 33 of insulators 3 attached to an adjacently arranged split core 2.

It should be noted that each folded-back insulating film 4 is arranged between coils 5 wound around respective adjacent split cores 2, and form an interphase insulation part 40 which insulates the phases of the coils 5 from each other. The interphase insulation part 40 according to embodiment 1 extends to a position corresponding to a substantially middle part of the tooth part 21, from the tooth front end part 22 side of the split core 2 to the radially outer side.

Figure 15:
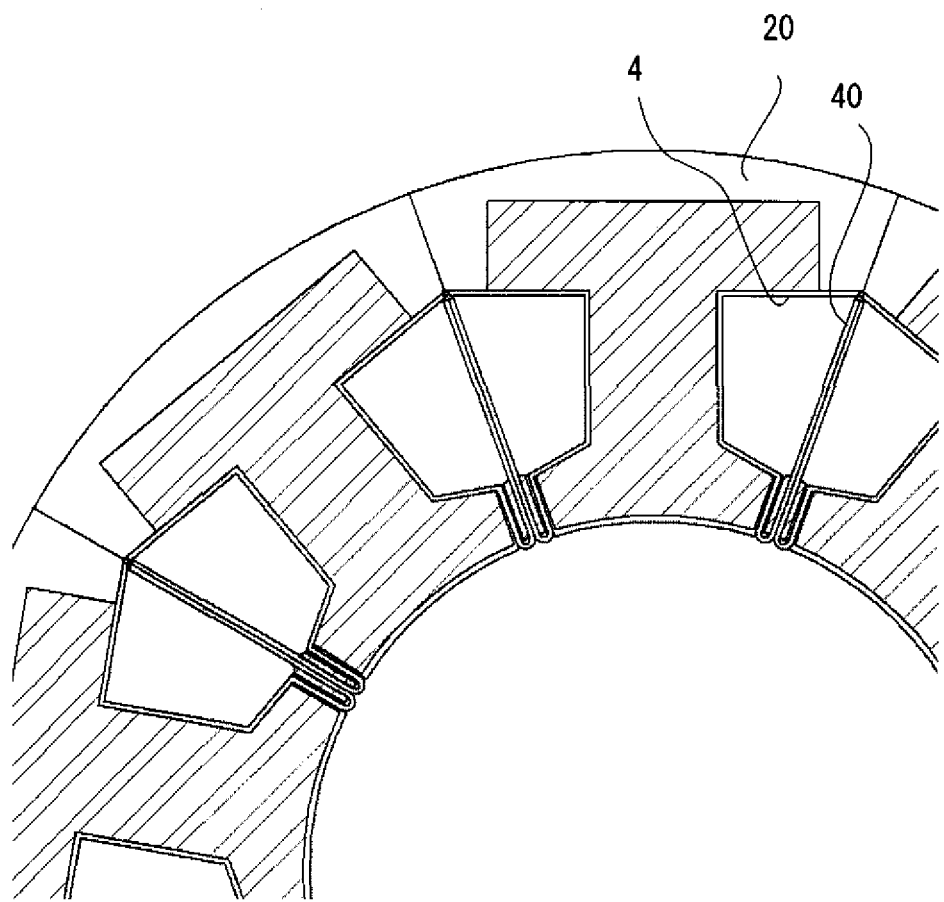
FIG. 15 is a partial sectional view illustrating another example of an insulating film according to embodiment 1 of the present invention.

Here, the length of the interphase insulation part 40 is determined according to the length of the portion, of the insulating film 4 before being cut, that covers the inner periphery surface side of the tooth front end part 22, and the position of the cut (see FIG. 10 and FIG. 11). For example, the insulating film 4 may be configured such that the length of the portion, of the insulating film 4, that covers the inner periphery surface of the tooth front end part 22, is set to be greater than that in the case shown in FIG. 10 and the like, and an end portion of the interphase insulation part 40 contacts the insulating film 4 on the back yoke part 20 side as shown in FIG. 15. If the configuration in which the end portion of the interphase insulation part 40 of the insulating film 4 fixed by being interposed between the projections 33 contacts the insulating film 4 on the back yoke part 20 side is employed, it is possible to assuredly insulate the phases of the coils 5 from each other.

Although not shown, the interphase insulation part 40 may be configured such that the end portion of the interphase insulation part 40 is further extended, and for example, the end portion is bent along the inner periphery surface of the back yoke part 20, thereby causing the insulating film 4 on the back yoke part 20 and the end portion of the interphase insulation part 40 to overlap each other. Accordingly, the interphase insulation between the coils 5 can be provided in a more assured manner.

As described above, in the stator 1 of embodiment 1, the insulating film 4 inserted in the slits 34 is folded back with the ribs 35 interposed therein, and further interposed between the ribs 35 that are at tip portions of projections 33 of adjacent insulators 3. Accordingly, the insulating film 4 can be assuredly fixed while being positioned. Moreover, by being fixed in the assured manner, the insulating film 4 does not escape from the opening, toward the inner periphery side, of a slot 6 located between the tooth front end parts 22 of adjacent split cores 2, especially during the drive and the like of the electrical rotating machine.

Moreover, since the problem of the insulating film 4 escaping from the opening can be solved, the insulating film 4 having the film shape can be readily employed as an insulating material for insulating the split core 2 from the coil 5. Since the insulating film 4 having the film shape is employed as the insulating material, and further the insulating film 4 is supported by means of the slits 34 formed in the projections 33, each slit 34 being formed to a corresponding axial end surface side of the tooth front end part 22, it is possible to secure the area for the winding portion of the coil 5 to the maximum extent. Accordingly, the space factor can be improved by use of a thicker wire for the coil 5 to be wound around the tooth part 21 or by increasing the number of turns, whereby the efficiency of the electrical rotating machine can be improved.

Moreover, since the insulating film 4 can be formed by bending one sheet of insulating material having a rectangular parallelepiped shape, the film insulating material taken out of a roll can be directly used, whereby a material yield rate can be increased.

By employing the configuration in which the inner periphery surface of the rib 35A is recessed by at least the thickness of the insulating film 4 to the radially outer side relative to the front end covering part 32, or the configuration in which the inner periphery surface of the front end covering part 32 is recessed by at least the thickness of the insulating film 4 to the radially outer side relative to the inner periphery surface of the tooth front end part 22, it is possible to prevent the folded-back portion of the insulating film 4 from protruding toward the center, further than the inner periphery surface of the tooth front end part 22. Further, by employing these configurations in combination, it is possible to more assuredly prevent the folded-back portion from protruding toward the center.

Further, if the folded-back portion fixed by being interposed between the projections 33 is arranged between coils 5 wound around adjacent split cores 2, the interphase insulation for the coils 5 can be provided. Further, if the configuration in which the end portion of the folded-back portion is caused to contact the insulating film 4 on the back yoke part 20 side is employed, it is possible to provide the interphase insulation between the coils 5 in a more assured manner.

Embodiment 2

Embodiment 1 employs the configuration in which the split cores are not coupled to each other. However, embodiment 2 employs coupled split cores in which back yoke parts of adjacently arranged split cores are coupled to each other by means of a thin wall part. Moreover, although an insulating film is formed for each split core in embodiment 1, insulating films to be attached to adjacent split cores are formed in such a manner as to be connected to each other in embodiment 2.

Hereinafter, embodiment 2 will be described. The same parts as in embodiment 1 are denoted by the same reference numerals, and description thereof will be omitted.

Figure 16:
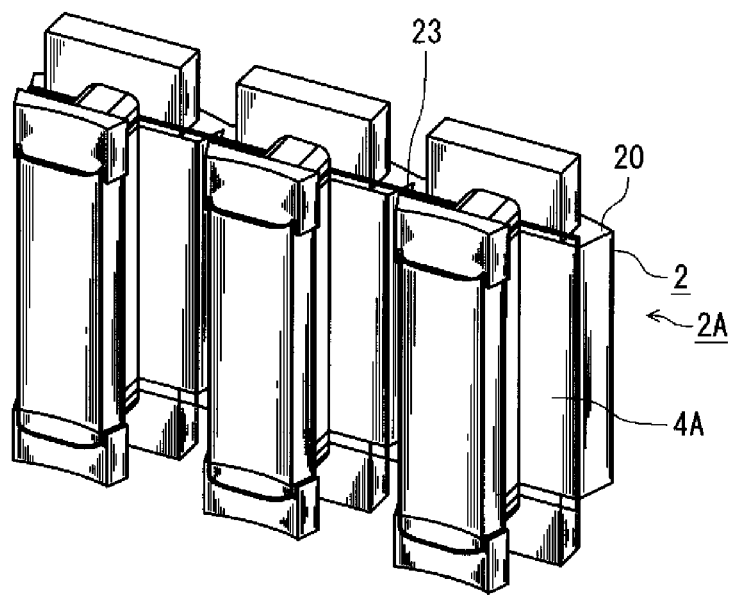
FIG. 16 is a perspective view illustrating structures of split cores and an insulating film according to embodiment 2 of the present invention.

FIG. 16 illustrates split cores and an insulating film according to embodiment 2.

As shown in FIG. 16, a coupled split core 2A has a shape of the back yoke parts 20 of the split cores 2 in embodiment 1 being coupled to each other by means of a thin wall part 23. The thin wall part 23 is formed on an outer periphery side of lateral side surfaces of each back yoke part 20. By bending the thin wall parts 23, the coupled split cores 2A are arranged in an annular form. Although each coupled split core 2A in the example shown in FIG. 16 is composed of three split cores 2 that are coupled by means of the thin wall part 23, the number of the split cores 2 to be coupled may be adjusted as necessary. It is understood that all of the split cores 2 that forms the stator 1 may be coupled.

An insulating film 4A has a shape in which the end portions of the insulating film 4 shown in FIG. 10 of embodiment 1 are extended and connected to corresponding end portions of insulating films 4 attached to adjacent split cores 2. As shown in FIG. 16, in the insulating film 4A, adjacent insulating films run along the inner peripheries of back yoke parts 20, and are connected to each other. The insulating film 4A can be formed by bending one sheet of an insulating material having a rectangular parallelepiped shape. Although in the example in FIG. 16, the insulating films to be attached to three split cores 2 are connected, the insulating films to be attached to four or more split cores 2 may be connected. For example, the insulating film 4A may have a shape of all of the insulating films being connected that are to be attached to all of the split cores that form the stator 1.

It should be noted that the insulating film 4A having such a connected shape is not used solely in a case where adjacent split cores are coupled by means of the thin wall part 23. For example, the insulating film 4A can be used also in a case where the split cores 2 are not coupled to each other as in embodiment 1. For example, the split cores 2 may be attached one by one to the insulating film 4A having the connected shape.

Figure 17:
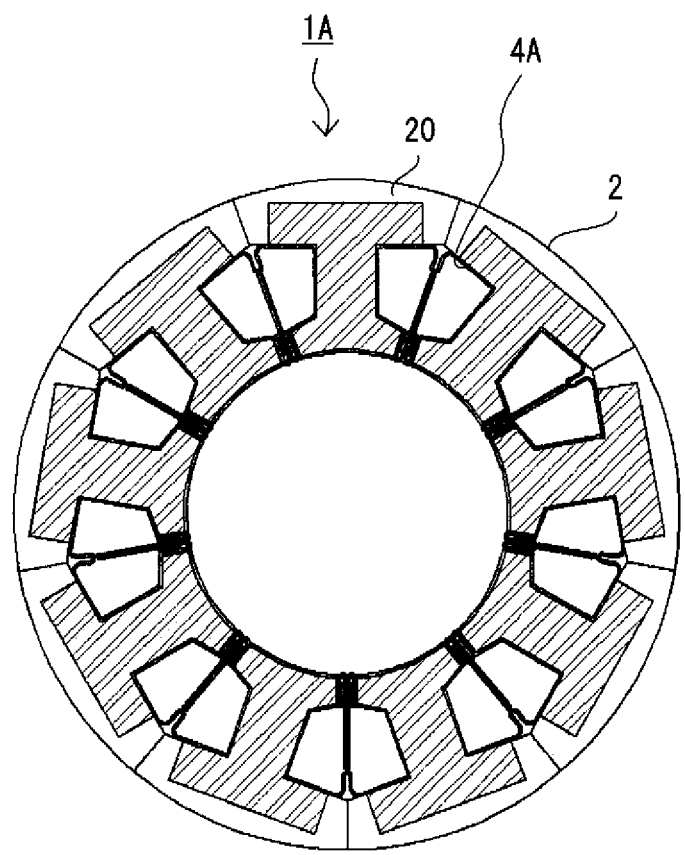
FIG. 17 is a cross-sectional view showing a structure of a stator according to embodiment 2 of the present invention.

Then, by following the same assembly steps as in embodiment 1, the stator 1A is formed as shown in FIG. 17. The insulating films of adjacent split cores 2 are connected to each other on the inner periphery side of the back yoke parts 20.

Figure 18:
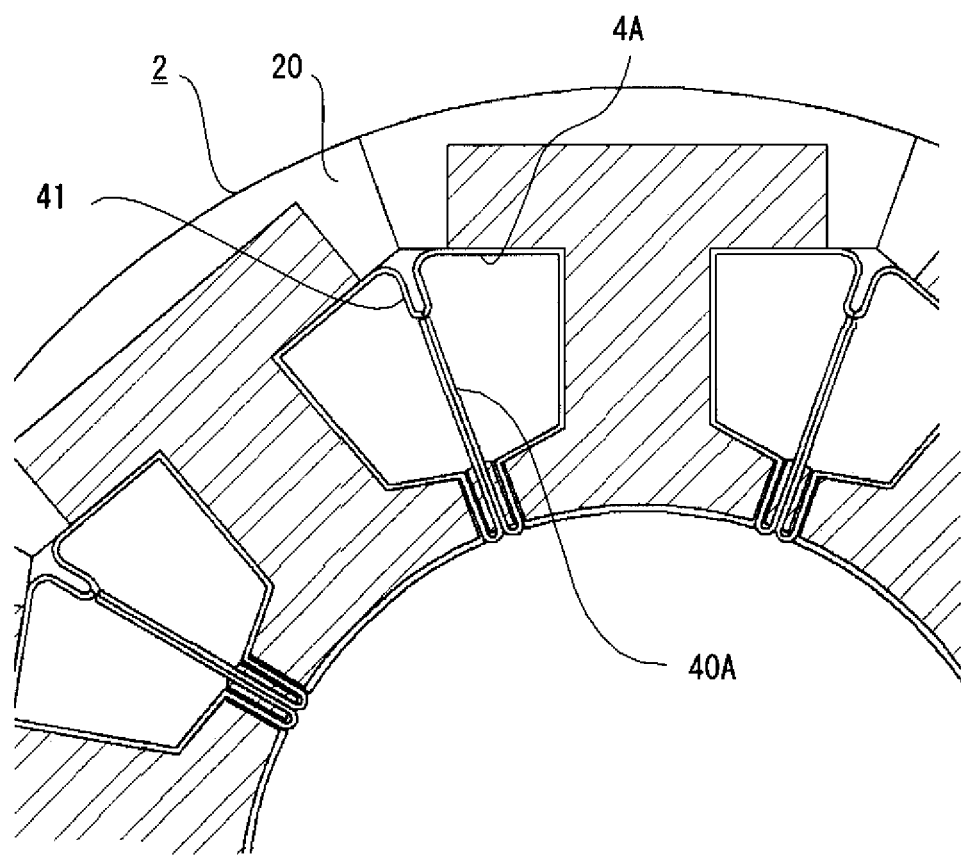
FIG. 18 is a partially enlarged view of FIG. 17 according to embodiment 2 of the present invention, and is a partial sectional view for illustrating a structure of the insulating film.

FIG. 18 is a partially enlarged view of FIG. 17. As described above, each insulating film 4A has the shape of end portions of adjacent insulating films 4 of embodiment 1 being extended and connected to each other. Therefore, when the split cores 2 are annularly arranged with the back yoke parts 20 contacted with each other, the portion in each insulating film 4A corresponding to the position where every two adjacent back yoke parts 20 contact each other becomes surplus, thereby forming a protrusion 41 which inwardly protrudes from the contact position. An interphase insulation part 40A formed in the insulating film 4A extends from the tooth front end part 22 side of the split core 2 toward the radially outer side, and an end portion of the interphase insulation part 40A contacts the protrusion 41. Such a configuration in which the interphase insulation part 40A contacts the protrusion 41 of the insulating film 4A on the back yoke part 20 side can assuredly provide insulation between the phases of the coils 5.

Figure 19:
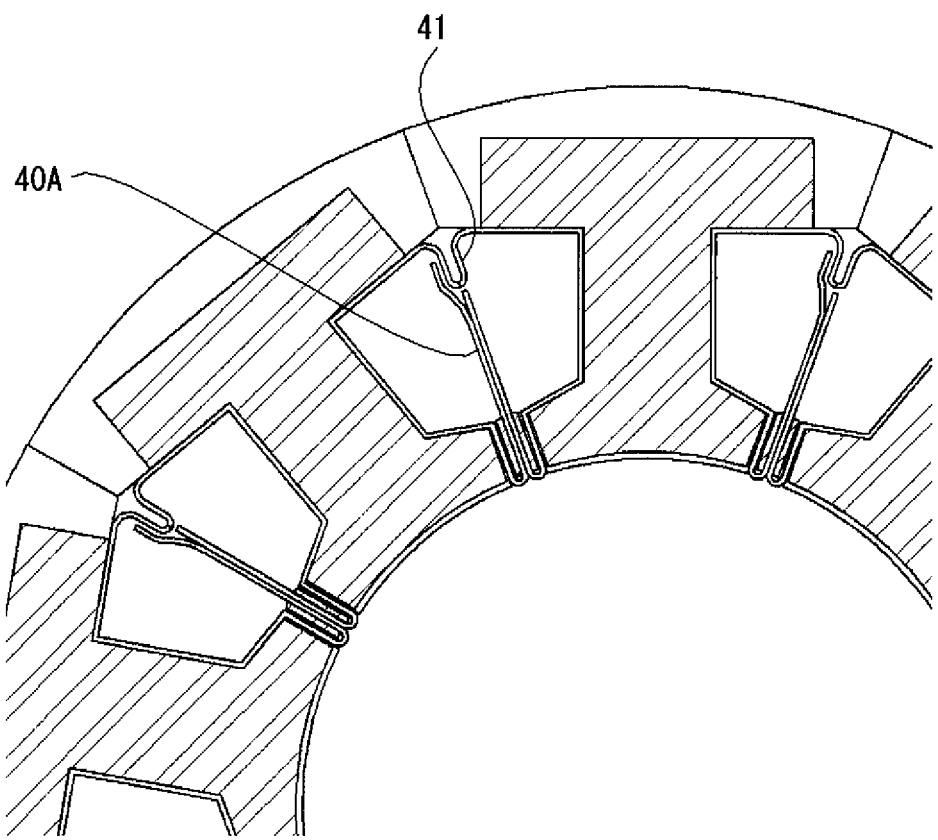
FIG. 19 is a partial sectional view for illustrating a structure of an insulating film of another example according to embodiment 2 of the present invention.

Further, the interphase insulation part 40A may be configured such that, as shown in FIG. 19, the end portion of the interphase insulation part 40A is further extended, for example, so as to overlap the protrusion 41. This can more assuredly provide interphase insulation between the coils 5.

As described above, since embodiment 2 employs the coupled split core 2A in which the split cores 2 are coupled by means of the thin wall part 23, it is easy to handle the split cores 2 during the assembly steps because they are not separated. Thus, by bending the thin wall parts 23, the split cores 2 can be easily arranged in an annular form and fixed. Moreover, by attaching the insulating film 4A to the coupled split core 2A, similar effects to those in embodiment 1 can be obtained.

Further, since insulating films to be attached to adjacent split cores 2 are connected into one insulating film 4A, the number of components can be reduced, and attachment of the insulating film 4A can be collectively performed, whereby assembly steps can be performed more efficiently.

It should be noted that the insulating film 4A which has the connected shape may not be necessarily used as the insulating film to be attached to the coupled split core 2A, and the insulating films 4 not connected to each other described in embodiment 1 may be used.

Further, although the split cores 2 are coupled by means of the thin wall part 23 provided in the back yoke parts 20 in embodiment 2, a configuration in which pivotable joint parts 24 are provided in the back yoke parts 20 to couple the split cores has similar effects.

Figure 20:
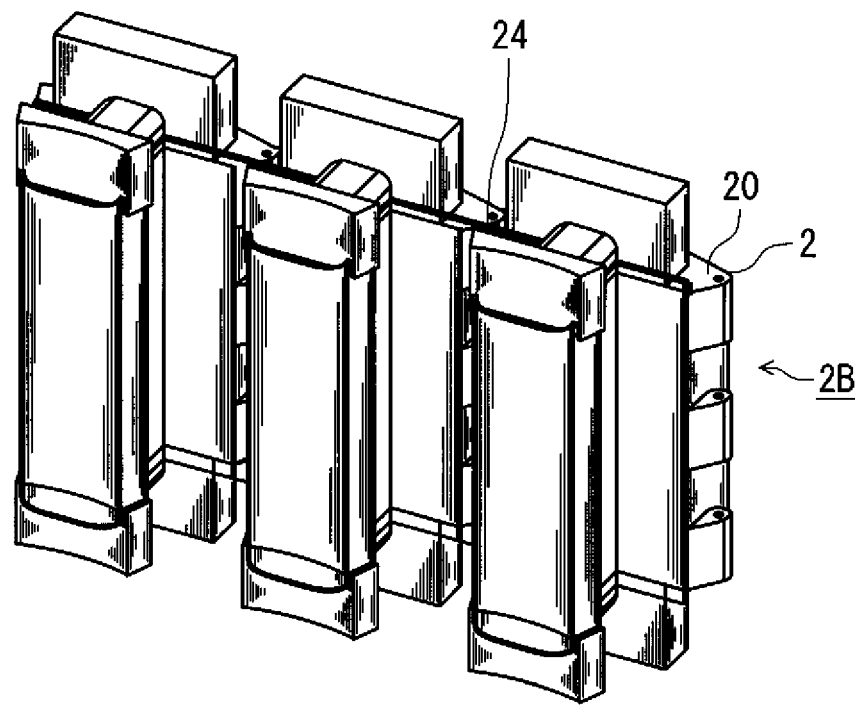
FIG. 20 is a perspective view for illustrating a structure of split cores of another example according to embodiment 2 of the present invention.

FIG. 20 is a perspective view for illustrating the structure of the split cores of another example of embodiment 2. As shown in FIG. 20, each joint part 24 is formed by portions of back yoke parts 20, of adjacently arranged split cores 2, being alternately stacked and fixed by means of pins or the like. By causing split cores included in each coupled split core 2B coupled by means of the joint part 24 to pivot, the split cores 2 can be easily arranged in an annular manner.

INDUSTRIAL APPLICABILITY

The present invention relates to an insulating film used for a slot insulation and an interphase insulation for a stator for an electrical rotating machine, and can be widely applied to stators of electrical rotating machines.

The invention claimed is:

1. A stator for an electrical rotating machine including a plurality of split cores that are annularly arranged, each split core composed of a back yoke part extending in a circumferential direction, a tooth part that is centrally-directed and projecting from a middle portion of the back yoke part, and a tooth front end part located at a front end of the tooth part opposite the back yoke part, the stator comprising:
a pair of insulators arranged on axial end surfaces, respectively, of the split core; and
an insulating film attached to lateral side surfaces of the tooth part, for insulating the split core from a coil wound around the tooth part, wherein
each insulator includes projections projecting further than the tooth front end part in the circumferential direction, slits which are provided in the respective projections to a corresponding axial end surface side of the tooth front end part and into which the insulating film is inserted, each of the slits being an aperture that penetrates through the respective projection and opens to a slot that includes the coil, and ribs formed in the respective projections, on end surface sides in the circumferential direction of the respective projections, and
the insulating film inserted into the slits is folded around the ribs to extend back to a back yoke part side with the ribs inside the folded insulating film, and fixed by being interposed between the ribs and adjacent ribs, so as to provide insulation between the coil and a coil wound around a tooth part of another adjacent split core, and the insulating film is formed by bending one sheet of insulating material.

2. The stator for the electrical rotating machine according to claim 1, wherein an inner periphery surface of each rib of the insulator is recessed to a radially outer side relative to an inner periphery surface of the insulator by at least the thickness of the insulating film.

3. The stator for the electrical rotating machine according to claim 1, wherein an inner periphery surface of the insulator is recessed to a radially outer side relative to an inner periphery surface of the tooth front end part by at least the thickness of the insulating film.

4. The stator for the electrical rotating machine according to claim 1, wherein an inner periphery surface of each rib of the insulator is recessed to a radially outer side relative to an inner periphery surface of the insulator by at least the thickness of the insulating film, and the inner periphery surface of the insulator is recessed to the radially outer side relative to an inner periphery surface of the tooth front end part by at least the thickness of the insulating film.

5. The stator for the electrical rotating machine according to claim 1, wherein an end portion of the insulating film that is fixed by being interposed between the projections of the insulators contacts the insulating film on the back yoke part side.

6. The stator for the electrical rotating machine according to claim 1, wherein the insulating film is connected to an insulating film of an adjacently arranged split core on an inner periphery side of the back yoke part.

7. The stator for the electrical rotating machine according to claim 1, wherein the back yoke part of the split core is coupled to a back yoke part of an adjacently arranged split core by means of a thin wall part, and the insulating film to be attached to the plurality of adjacently arranged split cores is formed by bending a sheet of an insulating material.

8. The stator for the electrical rotating machine according to claim 1, wherein the back yoke part of the split core is coupled to a back yoke part of an adjacently arranged split core by means of a pivotable joint part, and the insulating film to be attached to the plurality of adjacently arranged split cores is formed by bending a sheet of an insulating material.

9. The stator for the electrical rotating machine according to claim 1, wherein an inner surface of the insulating film contacts one of the ribs and an outer surface of the insulating film contacts an outer surface of an adjacent insulating film.

10. The stator for the electrical rotating machine according to claim 1, wherein two adjacent ribs of adjacent projections sandwich insulating films that are each folded around a respective one of the two adjacent ribs.

* * * * *